(12) United States Patent
Zhu et al.

(10) Patent No.: US 12,044,559 B2
(45) Date of Patent: Jul. 23, 2024

(54) METHOD FOR MONITORING A FLOW OF A MEDIUM BY MEANS OF A CORIOLIS MASS FLOWMETER AND A DIFFERENTIAL PRESSURE MEASUREMENT DEVICE

(71) Applicant: Endress+Hauser Flowtec AG, Reinach (CH)

(72) Inventors: Hao Zhu, Freising (DE); Josef Hubensteiner, Freising (DE)

(73) Assignee: Endress+Hauser Flowtec AG, Reinach (CH)

( * ) Notice: Subject to any disclaimer, the term of this patent is extended or adjusted under 35 U.S.C. 154(b) by 130 days.

(21) Appl. No.: 17/758,082

(22) PCT Filed: Dec. 1, 2020

(86) PCT No.: PCT/EP2020/084100
§ 371 (c)(1),
(2) Date: Jun. 28, 2022

(87) PCT Pub. No.: WO2021/136625
PCT Pub. Date: Jul. 8, 2021

(65) Prior Publication Data
US 2023/0032534 A1 Feb. 2, 2023

(30) Foreign Application Priority Data

Dec. 29, 2019 (DE) .................. 10 2019 009 021.7

(51) Int. Cl.
*G01F 1/34* (2006.01)
*G01F 1/84* (2006.01)

(52) U.S. Cl.
CPC .............. *G01F 1/34* (2013.01); *G01F 1/8477* (2013.01)

(58) Field of Classification Search
CPC ..... G01F 1/34; G01F 1/84–8495; G01N 9/32; G01N 9/34
See application file for complete search history.

(56) References Cited

U.S. PATENT DOCUMENTS 7,299,705 B2 * 11/2007 Gysling .................. G01F 25/10
73/861.354
8,613,228 B2 * 12/2013 Hussain ................ G01F 1/8413
73/861.355

(Continued)

FOREIGN PATENT DOCUMENTS

CN 103175580 A 6/2013
CN 104807508 A 7/2015

(Continued)

*Primary Examiner* — Justin N Olamit
(74) *Attorney, Agent, or Firm* — Kelly J. Smith; Endress+Hauser (USA) Holding, Inc.

(57) ABSTRACT

A method for monitoring flow of a medium by means of a pressure difference measuring device and a Coriolis mass flowmeter having two oscillators, which comprise, in each case, a bent measuring tube pair, which are arranged on top of one another and connected for parallel flow between the two pressure measuring points of the pressure difference measuring device, comprising steps as follows: Registering a pressure difference between the first pressure measuring point and the second pressure measuring point; registering a first density measured value based on at least a first oscillation frequency of the first oscillator; registering a second density measured value based on at least a second oscillation frequency of the second oscillator; ascertaining a flow measured value based on the pressure difference, when a difference between the first density measured value and the second density measured value is less than a density difference limit value.

8 Claims, 2 Drawing Sheets

(56) References Cited

U.S. PATENT DOCUMENTS

| | | | |
|---|---|---|---|
| 10,480,977 B2* | 11/2019 | Cunningham | .......... G01F 25/10 |
| 2007/0084298 A1 | 4/2007 | Rieder et al. | |
| 2008/0257066 A1 | 10/2008 | Henry et al. | |
| 2010/0280757 A1 | 11/2010 | Agar et al. | |
| 2012/0118077 A1 | 5/2012 | Henry | |
| 2012/0192658 A1 | 8/2012 | Hussain et al. | |
| 2015/0160056 A1 | 6/2015 | Schollenberger et al. | |

FOREIGN PATENT DOCUMENTS

| | | |
|---|---|---|
| DE | 102004035971 A1 | 2/2006 |
| DE | 102010000760 A1 | 7/2011 |
| DE | 102015104931 A1 | 6/2016 |
| DE | 102016007905 A1 | 1/2018 |
| GB | 2572836 A | 10/2019 |
| WO | 2018001635 A1 | 1/2018 |
| WO | 2019086188 A2 | 5/2019 |

* cited by examiner

METHOD FOR MONITORING A FLOW OF A MEDIUM BY MEANS OF A CORIOLIS MASS FLOWMETER AND A DIFFERENTIAL PRESSURE MEASUREMENT DEVICE

CROSS-REFERENCE TO RELATED APPLICATIONS

The present application is related to and claims the priority benefit of DPMA Patent Application No. 10 2019 009 021.7, filed on Dec. 29, 2019, and International Patent Application No. PCT/EP2020/084100, filed Dec. 1, 2020, the entire contents of which are incorporated herein by reference.

TECHNICAL FIELD

The invention relates to a method for monitoring flow of a medium, which includes at least one liquid phase, by means of a Coriolis mass flowmeter with bent measuring tubes, and a pressure difference measuring device, which is adapted to ascertain a pressure difference between a first pressure measuring point and a second pressure measuring point of a pipeline, wherein the Coriolis mass flowmeter is arranged between the first pressure measuring point and the second pressure measuring point of the pipeline, wherein the Coriolis mass flowmeter serves as differential pressure producer, wherein the first pressure measuring point is arranged between a pressure source and the Coriolis mass flowmeter, wherein the second pressure measuring point is arranged between the Coriolis mass flowmeter and a pressure sink. In the case of the described measuring arrangements, it can occur that the mass flow stops, when the bends of the measuring tubes are asymmetrically filled with a liquid medium, wherein a gas pressure of the pipeline stabilizes this asymmetric filling. This leads to a pressure difference between the two pressure measuring points due to the asymmetric liquid column in the tube bends. This pressure difference suggests a flow, even though the medium is actually not moving.

BACKGROUND

It is, consequently, known to connect a throttled bypass-capillary line between the two pressure measuring points in parallel with the pipeline, which practice should lead in the case of non-moving medium in a reasonable amount of time to a pressure equalization between the two pressure measuring points. This functions in principle but requires a lot of maintenance, since a capillary line can easily plug. Moreover, in an operating mode, in which the flow measurement occurs by Coriolis mass flowmeter, the flow through the capillary line is not registered by the Coriolis mass flowmeter. This leads to measurement errors.

Patent application DE 102019125682.8, unpublished as of the earliest filing date of this application, discloses another approach, in the case of which a media property, such as density or velocity of sound, are compared at two measuring points before and behind the Coriolis mass flowmeter. In the case of agreement, a pressure difference is to be evaluated as caused by flow. In the case of lasting significant deviations, it is to be assumed that the medium is not moving and the pressure difference is caused by a hydrostatic column. This approach functions reliably but is associated with the extra costs of two sensors.

SUMMARY

It is, consequently, an object of the present disclosure to provide a method, which enables with less effort a reliable distinguishing between standing and flowing medium. The object is achieved according to the present disclosure.

The method of the invention serves for monitoring flow of a medium, which includes at least one liquid phase, by means of a Coriolis mass flowmeter and a pressure difference measuring device, which is adapted to ascertain a pressure difference between a first pressure measuring point and a second pressure measuring point of a pipeline, wherein the Coriolis mass flowmeter is arranged between the first pressure measuring point and the second pressure measuring point of the pipeline, wherein the Coriolis mass flowmeter serves as differential pressure producer, wherein the first pressure measuring point is arranged between a pressure source and the Coriolis mass flowmeter, wherein the second pressure measuring point is arranged between the Coriolis mass flowmeter and a pressure sink; wherein the Coriolis mass flowmeter includes at least two oscillators with, in each case, at least one bent measuring tube, wherein the bent measuring tubes have, in each case, a low point, which is arranged relative to a local gravitational field at the deepest point of the measuring tube, wherein the measuring tubes of the oscillators are arranged between two manifolds, as a result of which the measuring tubes are connected for parallel flow, wherein a first low point of a measuring tube of a first oscillator is arranged above a second low point of a measuring tube of a second oscillator, wherein the method comprises steps as follows: registering a pressure difference between the first pressure measuring point and the second pressure measuring point; registering a first density measured value based on at least a first oscillation frequency of the first oscillator; registering a second density measured value based on at least a second oscillation frequency of the second oscillator; and ascertaining a flow measured value based on the pressure difference, when a difference between the first density measured value and the second density measured value is less than a density difference limit value.

In a further development of the invention, the density difference limit value comprises a function of density of the medium.

In a further development of the invention, the density difference limit value comprises a function of gas charge of the medium.

In a further development of the invention, gas charge is detected based on density fluctuations, and/or damping of measuring tube oscillations, or fluctuation of the damping.

In a further development of the invention, the first measuring tube and the second measuring tube have, in each case, a measuring tube centerline, wherein the density difference limit value is a function of vertical separation of the measuring tube centerlines at the low points of the measuring tubes.

In a further development of the invention, the ascertaining of a flow measured value based on the pressure difference comprises checking whether the pressure difference exceeds a threshold value, wherein a flow of zero is assumed below the threshold value.

In a further development of the invention, the threshold value amounts to no greater than 30 mbar, especially no greater than 25 mbar.

BRIEF DESCRIPTION OF THE DRAWINGS

In a further development of the invention, a valve is arranged between the second pressure measuring point and the pressure sink.

The invention will now be explained based on examples of embodiments presented in the drawing, the figures of which show as follows.

DETAILED DESCRIPTION

Figure 1:
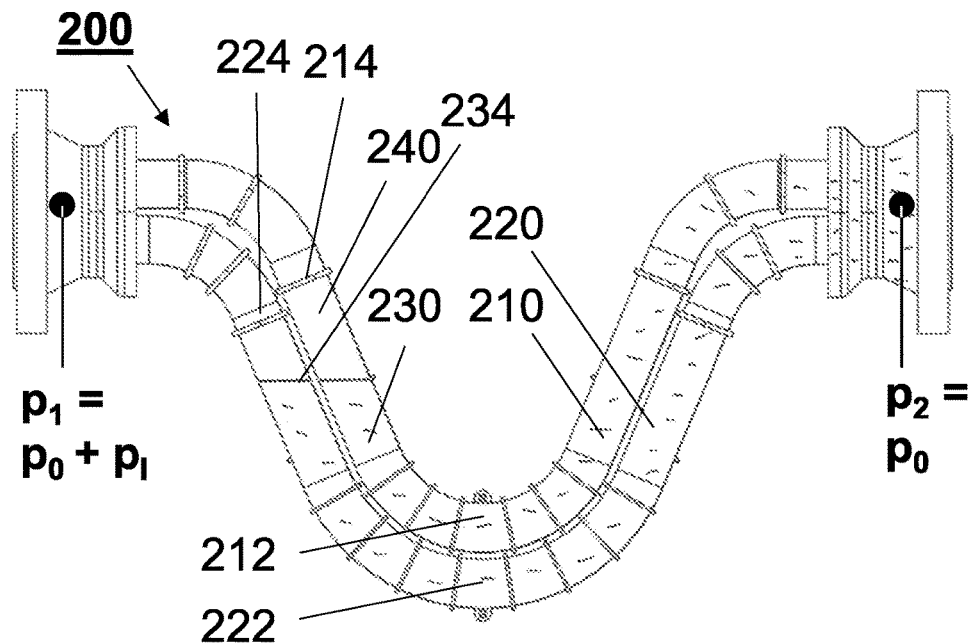
FIG. 1 shows a longitudinal section of a Coriolis mass flowmeter in the case of medium not moving.

The problem, to which the invention is directed, is explained based on FIG. 1. When a liquid flow through a Coriolis mass flowmeter 200 is paused at a disadvantageous point in time, an only partial filling of measuring tube bends 210, 220 with liquid 230 can occur, wherein the liquid is held shifted with gas 240 under an inlet end pressure $p_1$, which is the sum of a base pressure $p_0$ and the hydrostatic pressure $p_1$ of the shifted liquid column. An outlet-side pressure $p_2$ is, in contrast, essentially equal to the base pressure $p_0$. Insofar as the Coriolis mass flowmeter 200 serves as differential pressure producer between two measuring points for the inlet side pressure and the outlet-side pressure, in order based on the pressure difference to determine a flow rate between the two measuring points, the hydrostatic pressure $p_1$ of the shifted liquid column looks like a flow is present, even though the liquid is really at a standstill. An object of the invention is to distinguish this seeming flow from an actual flow.

Figure 2:
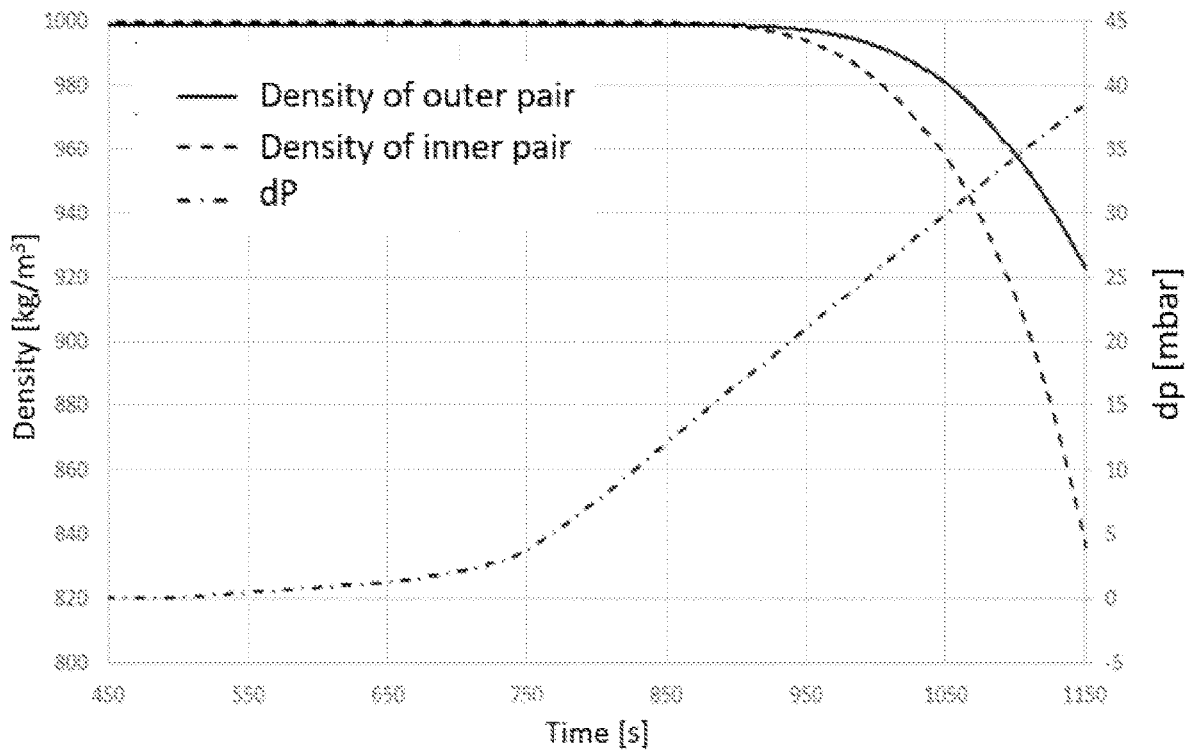
FIG. 2 shows a graph showing a relationship between density measured values and pressure difference of the measuring points.
Figure 3:
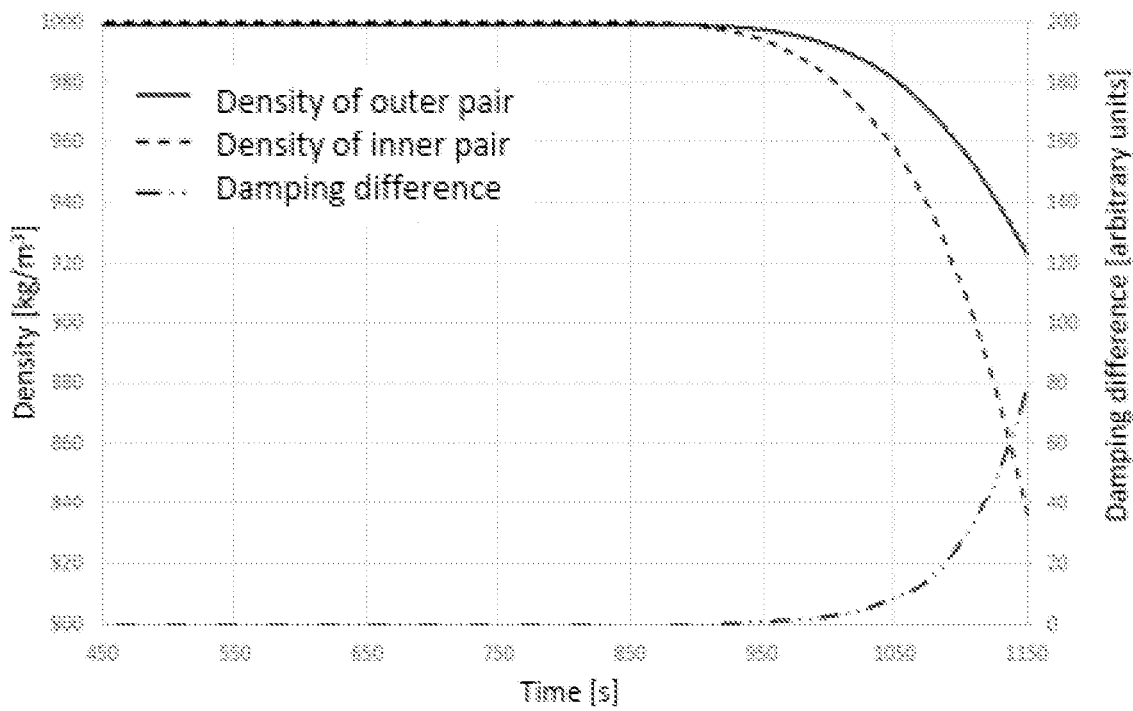
FIG. 3 shows a graph showing a relationship between apparent density measured values and difference in damping of measuring tube oscillations.

For this, the invention utilizes, at least partially, the relationships shown in FIGS. 2 and 3, wherein involved, in such case, is a Coriolis mass flowmeter 200 having four bent measuring tubes, which are arranged in two pairs of, in each case, parallel, equal type, measuring tubes 210, 220, wherein the low points 212, 222 of the measuring tubes of the measuring tube pairs lie, in each case, at the same height and differ between the measuring tube pairs.

The data in FIGS. 2 and 3 come from an experiment, in the case of which liquid was virtually steadily pushed from the measuring tubes of the Coriolis mass flowmeter 200 shown in FIG. 1 by a slowly rising pressure loading with a gas. When a flow stops under real operating conditions, the relationships shown here for some one of the points in time can be those that actually govern the given situation.

FIG. 2 shows that in the case of the pushing out of liquid the pressure difference rises, firstly, without affecting the density measured values. This is due to the fact that an interface 234 between liquid 230 and gas 240 initially has still not reached inner couplers 214, 224 of the measuring tube pairs of the Coriolis mass flowmeter 200 limiting the oscillating sections of the measuring tubes 210, 220 effective for the measuring. When the interface 234 eventually passes below the couplers 214, 224, the lacking liquid 230 in the measuring tubes 210, 220 acts in the form of a seemingly lessened density. This effect is more noticeable in the case of the inner, or upper, measuring tube pair 210, since the relative importance of the missing liquid is greater than in the case of the outer, or lower, measuring tube pair 220. When, consequently, in measurement operation density measured values deviating between the measuring tube pairs 210, 220 are detected, which are not otherwise explainable, these are taken as indication of partially filled measuring tubes in the case of liquid not flowing. Accordingly, an associated pressure difference is not interpreted as caused by flow.

FIG. 3 shows the curve of the pressure difference replaced with a curve for a difference of the damping of the measuring tube oscillations. It is evident that in the case of completely filled measuring tubes 210, 220 the damping of the measuring tube oscillations of the different measuring tube pairs is essentially equal and the difference is, thus, negligible. With increasing pushing of the liquid 230, however, the damping characteristics of the measuring tube pairs differ, since the relative importance of the position of the interface is greater in the case of the inner measuring tube pair 210.

As a result, it can, thus, be decided based on the density deviations and the difference between the dampings of the measuring tube oscillations, whether a pressure difference between the measuring points indicates flow or no flow.

An actual density difference can also occur when a gas-charged liquid undergoes a stratification in the pipeline, wherein in such case a lower density is to be expected in the upper measuring tube pair. In this case, however, with flow of the gas charge corresponding density fluctuation should be able to be detected. Moreover, the gas charge can be characterized with the so-called multifrequency technology. In the absence of these features, it can be assumed that the liquid is not flowing.

Figure 4:
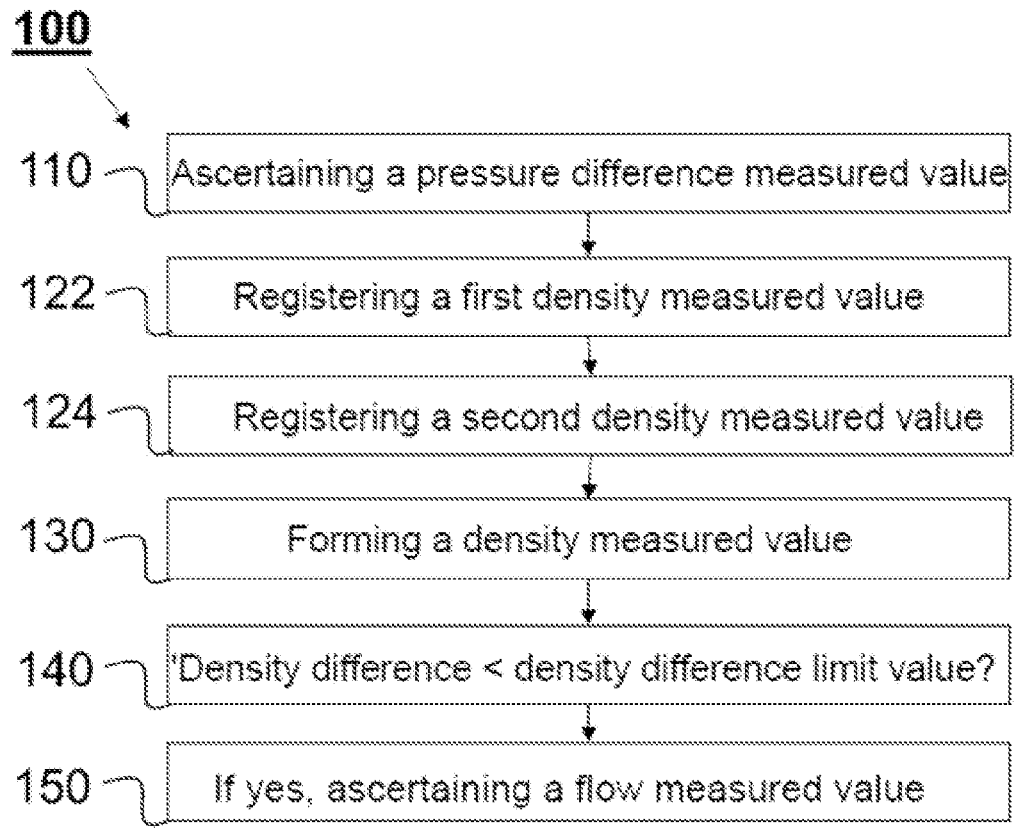
FIG. 4 shows a flow diagram of an example of an embodiment of the method of the present disclosure.

When applying the above principles, the method of the invention can be implemented in the example of an embodiment shown in FIG. 4.

The method 100 begins with registering in step 110 a pressure difference between a first pressure measuring point and a second pressure measuring point, wherein a Coriolis mass flowmeter of FIG. 1 is arranged between the pressure measuring points. There follows the registering of a first density measured value in step 122 based on at least a first oscillation frequency of the first oscillator and the registering of a second density measured value in step 124 based on at least a second oscillation frequency of the second oscillator. Then a density difference is formed in step 130. There follows a testing in step 140, whether the density difference subceeds a density difference limit value. If this is true, there follows an ascertaining of a flow measured value in step 150 based on the pressure difference. In such case, it is preferably also checked, whether the pressure difference exceeds a threshold value, for example, 25 mbar. If the test result is false, a flow of zero can be associated with the pressure difference.

The invention claimed is:

1. A method for monitoring flow of a medium, which includes at least one liquid phase, using a Coriolis mass flowmeter and a differential pressure gauge, which is adapted to ascertain a pressure difference between a first pressure measuring point and a second pressure measuring point of a pipeline, wherein the Coriolis mass flowmeter is arranged between the first pressure measuring point and the second pressure measuring point of the pipeline, wherein the Coriolis mass flowmeter serves as differential pressure producer, wherein the first pressure measuring point is arranged between a pressure source and the Coriolis mass flowmeter, wherein the second pressure measuring point is arranged between the Coriolis mass flowmeter and a pressure sink;

wherein the Coriolis mass flowmeter includes at least two oscillators, the at least two oscillators each having at least one bent measuring tube, wherein each of the at least one bent measuring tube has a low point, which is arranged relative to a local gravitational field at a deepest point of the respective bent measuring tube, wherein measuring tubes of the at least two oscillators are arranged between two manifolds, as a result of which the measuring tubes are connected for parallel flow, wherein a first low point of a measuring tube of a first oscillator is arranged above a second low point of a measuring tube of a second oscillator, wherein the method comprises:

registering a pressure difference between the first pressure measuring point and the second pressure measuring point;

registering a first density measured value based on at least a first oscillation frequency of a first oscillator of the at least two oscillators;

registering a second density measured value based on at least a second oscillation frequency of a second oscillator of the at least two oscillators; and ascertaining a flow measured value based on the pressure difference, when a difference between the first density measured value and the second density measured value is less than a density difference limit value.

2. The method as claimed in claim 1, wherein the density difference limit value is a function of a density of the medium.

3. The method as claimed in claim 1, wherein the density difference limit value is a function of a gas charge of the medium.

4. The method as claimed in claim 3, wherein the gas charge is detected based on density fluctuations, and/or damping of measuring tube oscillations, or fluctuation of the damping.

5. The method as claimed in claim 1, wherein the measuring tube of the first oscillator and the measuring tube of the second oscillator each have a measuring tube centerline, wherein the density difference limit value is a function of a vertical separation between a low point of the centerline of the measuring tube of the first oscillator and a low point of the centerline of the measuring tube of the second oscillator.

6. The method as claimed in claim 1, wherein the ascertaining of the flow measured value based on the pressure difference comprises checking whether the pressure difference exceeds a threshold value, wherein a flow of zero is assumed when the pressure difference is below the threshold value.

7. The method as claimed in claim 6, wherein the threshold value is not greater than 30 mbar.

8. The method as claimed in claim 1, wherein a valve is arranged between the second pressure measuring point and the pressure sink.

* * * * *